(12) United States Patent
Le Strat et al.

(10) Patent No.: US 6,901,113 B2
(45) Date of Patent: May 31, 2005

(54) PROCESSING METHODS AND DEVICES FOR SENDING INFORMATION SYMBOLS OVER MULTIPLEXED CHANNELS, AND CORRESPONDING PROCESSING METHODS AND DEVICES FOR RECEPTION

(75) Inventors: Evelyne Le Strat, Paris (FR);
Catherine Leretaille, Paris (FR);
Stéphane Gosne, Issy-les-Moulineaux (FR)

(73) Assignee: Nortel Networks Limited (CA)

( * ) Notice: Subject to any disclaimer, the term of this patent is extended or adjusted under 35 U.S.C. 154(b) by 795 days.

(21) Appl. No.: 09/759,843

(22) Filed: Jan. 12, 2001

(65) Prior Publication Data

US 2001/0024451 A1 Sep. 27, 2001

(30) Foreign Application Priority Data

Jan. 14, 2000 (FR) .......................................... 00 00494

(51) Int. Cl.[7] .............................. H04L 27/04; H04J 3/00
(52) U.S. Cl. ...................... 375/295; 370/336; 370/498
(58) Field of Search ......................... 375/141, 146.295, 375/377; 370/335, 342, 441, 477, 468, 498, 336

(56) References Cited

U.S. PATENT DOCUMENTS

| | | | |
|---|---|---|---|
| 4,908,827 A | | 3/1990 | Gates |
| 5,533,014 A | * | 7/1996 | Willars et al. ............... 370/335 |
| 5,539,730 A | * | 7/1996 | Dent .......................... 370/280 |
| 5,933,431 A | | 8/1999 | Ko |

FOREIGN PATENT DOCUMENTS

| | | |
|---|---|---|
| EP | 0 996 301 | 4/2000 |
| GB | 2 308 044 | 6/1997 |
| WO | WO94/29981 | 12/1994 |
| WO | WO99/55104 | 10/1999 |
| WO | WO99/56410 | 11/1999 |

OTHER PUBLICATIONS

3rd Generation Partnership Project (3GPP); Technical Specification Group Radio Access Network Multiplexing and Channel Coding (FDD), (3g TS 25.212 Version 3.0.0). On line at URL : ftp : //ftp. 3gpp.org/Specs/October_99/25_series/25212–300.zip.

* cited by examiner

Primary Examiner—Tesfaldet Bocure
(74) Attorney, Agent, or Firm—DLA Piper Rudnick Gray Cary US LLP (57) ABSTRACT

A scheme for multiplexing transport channels on one or several communication channels is used to operate in a normal mode and in a compressed mode which requires a lower symbol rate to provide in active periods in the communication channels. To match the symbol rate on each of the transport channels, a symbol puncturing is performed in two passes: marked symbols are introduced and are subjected, along with the other information symbols, to different operations including an interleaving, before being deleted from the transmitted sequence. Accordingly, those operations can be performed in the same manner in the normal and compressed modes, which limits the complexity of the communicating entities.

9 Claims, 8 Drawing Sheets

PROCESSING METHODS AND DEVICES FOR SENDING INFORMATION SYMBOLS OVER MULTIPLEXED CHANNELS, AND CORRESPONDING PROCESSING METHODS AND DEVICES FOR RECEPTION

BACKGROUND OF THE INVENTION

The present invention relates to digital transmissions, and more precisely to the shaping of one or more streams of information symbols to be transmitted over one or more communication channels.

In the present description, the invention will be described more particularly in its application, nonlimiting, to third generation radio communication networks of the UMTS type ("Universal Mobile Telecommunication System"). A general description of this system is presented in the article: "L'UMTS: la génération des mobiles multimédia" [UMTS: the generation of the multimedia mobile] by P. Blanc et al., L'Echo des Recherches, no. 170, $4^{th}$ quarter 1997/ $1^{st}$ quarter 1998, pages 53–68. In this system, the invention finds application within the framework of downlinks, that is to say from the base stations to the terminal equipment, in frequency duplex mode (or FDD, "Frequency Domain Duplex").

UMTS is a radio communication system using code-division multiple access (CDMA), that is to say the symbols transmitted are multiplied by spreading codes consisting of samples known as "chips" whose rate (3.84 Mchip/s in the case of UMTS) is greater than that of the symbols transmitted. The spreading codes distinguish between various physical channels PhCH which are superimposed on the same transmission resource constituted by carrier frequency. The auto-and cross-correlation properties of the spreading codes enable the receiver to separate the PhCHs and to extract the symbols intended for it. For UMTS in FDD mode on the downlink, a scrambling code is allocated to each base station, and various physical channels used by this base station are distinguished by mutually orthogonal "channelization" codes. For each PhCH, the global spreading code is the product of the "channelization" code and the scrambling code of the base station. The spreading factor (equal to the ratio of the chip rate to the symbol rate) is a power of 2 lying between 4 and 512. This factor is chosen as a function of the bit rate of the symbols to be transmitted on the PhCH.

Figure 1:
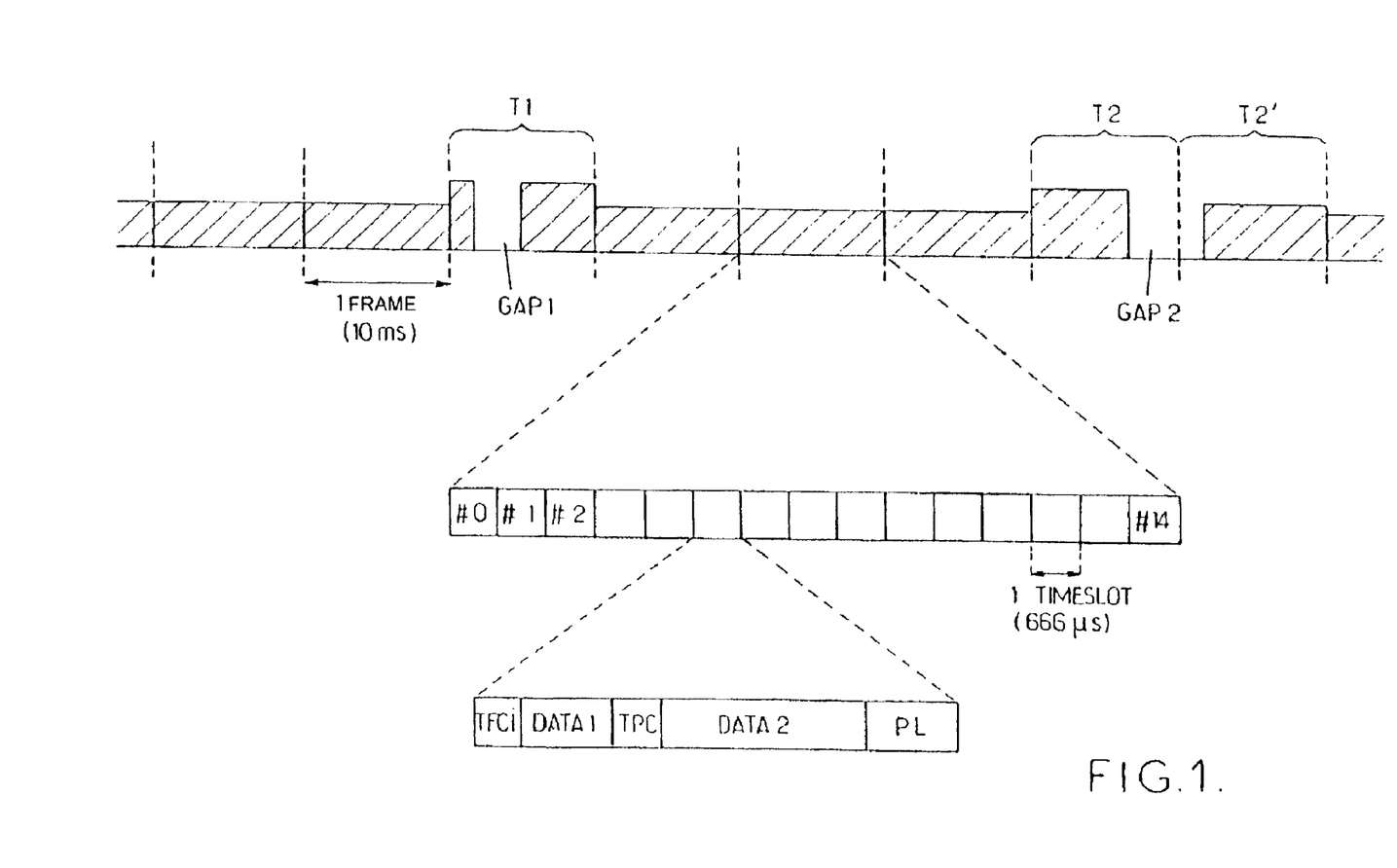
FIG. 1, commented on earlier, is a diagram illustrating the frame structure employed on the downlinks in the UMTS system in FDD mode.

The various physical channels obey a frame structure illustrated in FIG. 1. The 10 ms frames follow one another on the carrier frequency used by the base station. Each frame is subdivided into 15 time slots of 666 μs. Each slot can carry the superimposed contributions of one or more physical channels, comprising common channels and dedicated channels DPCH ("Dedicated Physical CHannel"). The lower chart of FIG. 1 illustrates the contribution of a downlink DPCH at a time slot in FDD mode, which comprises:

- a certain number of pilot symbols PL placed at the end of the slot. Known a priori to the terminal, these symbols PL enable it to acquire the synchronization and to estimate parameters which are useful in demodulating the signal;
- a transport format combination indicator TFCI placed at the start of the slot;
- a transmit power control TPC to be used by the terminal on the uplink; and
- two data fields, denoted DATA1 and DATA2, placed either side of the TPC field.

The DPCH can thus be seen as amalgamating a physical channel dedicated to control, or DPCCH ("Dedicated Physical Control CHannel"), corresponding to the fields TFCI, TPC and PL, and a physical channel dedicated to the data, or DPDCH ("Dedicated Physical Data CHannel"), corresponding to the fields DATA1 and DATA2.

For one and the same communication, it is possible to establish several DPCHs corresponding to different "channelization" codes, whose spreading factors may be equal or different. This situation is encountered in particular when a DPDCH is insufficient to provide the transmission bit rate required by the application. In what follows, Y will denote the number, equal to or greater than 1, of downlink physical channels used for one and the same communication from a base station.

Moreover, this same communication can use one or more transport channels TrCH. Multiplexed TrCHs are typically used for multimedia transmissions, in which signals of different natures to be transmitted simultaneously require different transport characteristics, in particular as regards protection against transmission errors. On the other hand, certain coders may output, in order to represent a given signal (audio for example), several streams of symbols having different perceptual importances and therefore requiring different degrees of protection. Multiple TrCHs are then used to transport these various symbol streams. In what follows, X will denote the number, equal to or greater than 1, of transport channels used for a given communication on the aforesaid Y physical channels.

For each transport channel i ($1 \leq i \leq X$), there is defined a transmission time interval TTI composed of $F_i$ consecutive frames, with $F_i=1, 2, 4$ or $8$. Typically, the shorter the delay with which the signal conveyed by the transport channel must be received, the shorter is the TTI used. For example, a TTI of 10 ms ($F_i=1$) will be used for a telephony application, while a TTI of 80 ms ($F_i=8$) may be used for a data transmission application.

The multiplexing of the X streams of information symbols emanating from the TrCHs on the Y PhCHs is described in detail in the technical specification 3G TS 25.212, "Multiplexing and channel coding (FDD)", version 3.0.0 published in October 1999 by the 3GPP ($3^{rd}$ Generation Partnership Project), which can be loaded from ftp://ftp.3gpp.org/Specs/October_99/25_series/.

Figure 2:
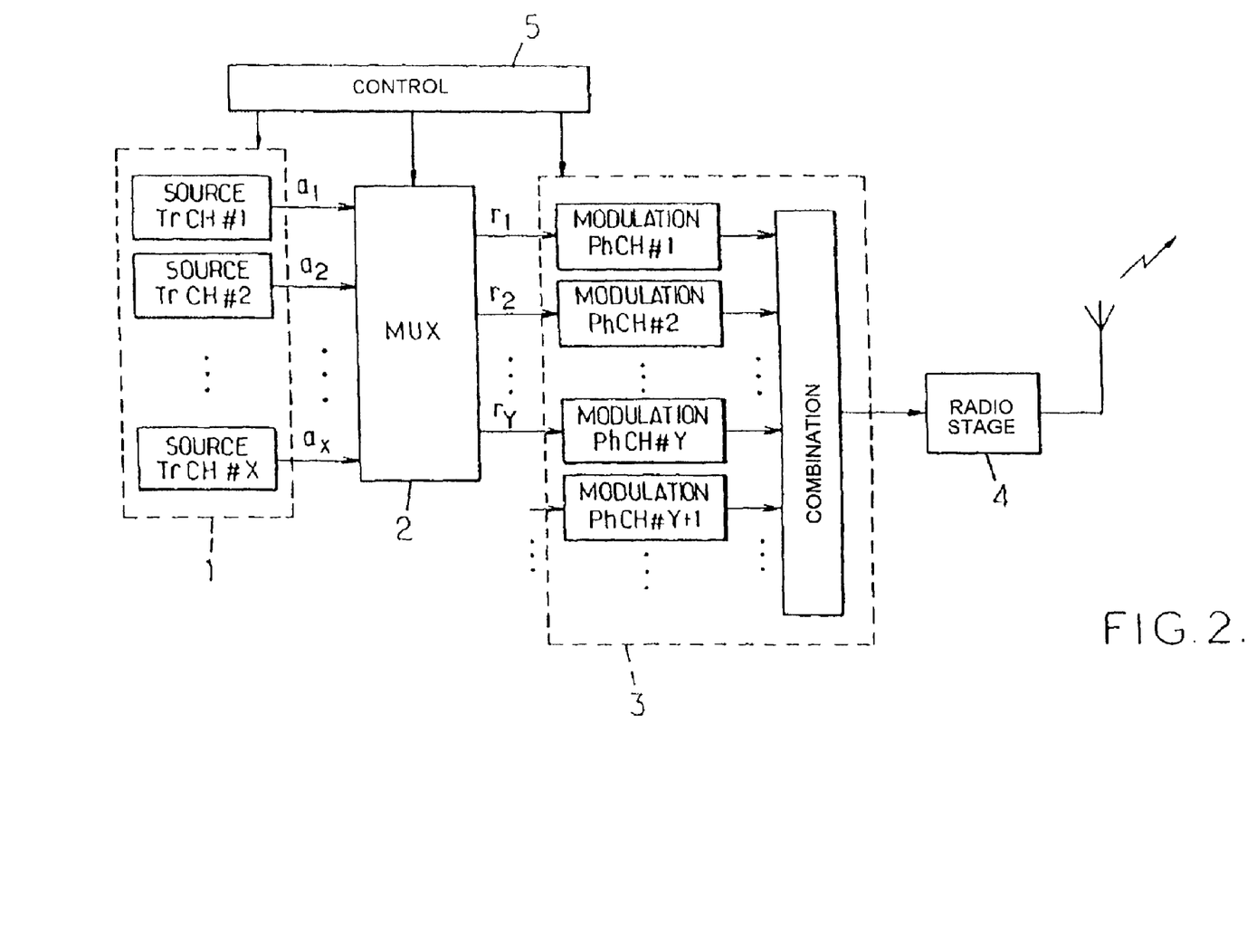
FIGS. 2 and 3, commented on earlier, are schematic diagrams of a base station and of a UMTS terminal to which the invention may be applied.

FIG. 2 diagrammatically illustrates the sending part of a UMTS base station operating in FDD mode. Block 1 denotes the set of sources respectively outputting streams of information symbols $a_i$ ($1 \leq i \leq X$) in relation to the X TrCHs used in a communication.

Block 2 multiplexes the streams $a_i$ to form what is referred to as a coded composite transport channel, or CCTrCH, which is subsequently subdivided into one or more physical channels PhCH#j ($1 \leq j \leq Y$) on which synchronized streams of symbols respectively denoted $r_j$ are transmitted.

Block 3 designates the circuits which modulate the streams $r_j$ and combine them to form a signal processed by the radio stage 4 before being sent over the air interface. Block 3 caters for the spreading, by the "channelization" codes assigned to the PhCHs, of each of the streams $r_j$, as well as of any additional streams which may be output in respect of other communications supported at the same moment by the base station, the various streams of symbols thus spread being subsequently summed and then multiplied by the scrambling code of the base station. The sequencing and parameterization of blocks 1, 2, 3 is catered for by a control unit 5 in accordance with the parameters defined for the base station and for the relevant communication.

Figure 3:
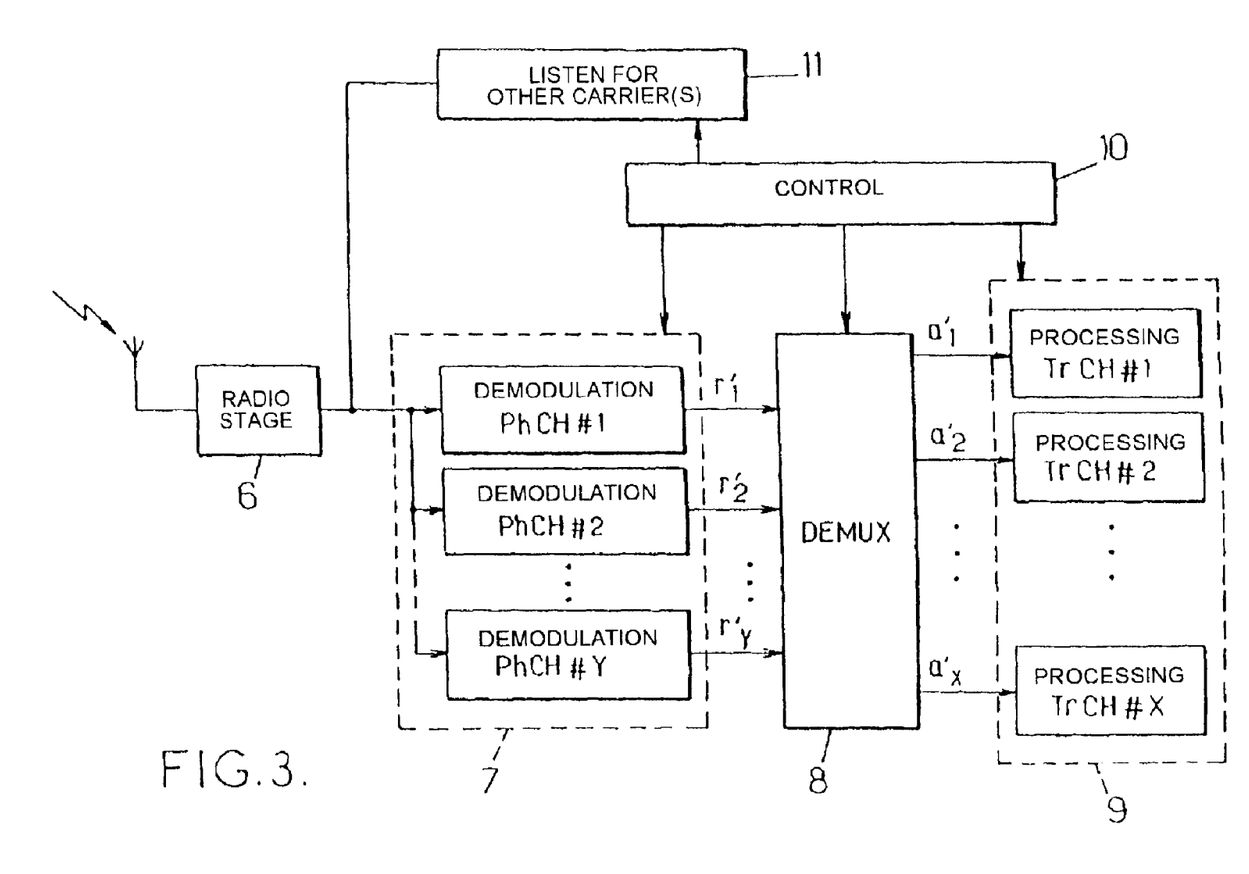

FIG. 3 diagrammatically illustrates the receiving part of a UMTS terminal communicating in FDD mode with a base station according to FIG. 2. Block 7 demodulates the baseband signal restored by the radio stage 6 from the signal picked up by the antenna of the terminal, using the scrambling code of the base station and the Y "channelization" codes assigned to the terminal. For each of the Y physical channels j ($1 \leq j \leq Y$), block 7 outputs data $r'_j$ representing estimates of the symbols of the stream $r_j$ formed at base station level.

In the case where the symbols are bits, the estimates $r'_j$ are "softbits", that is to say numerical values whose sign characterizes the estimated bit and whose absolute value represents the likelihood of this estimate.

The Y data streams $r'_j$ are delivered to a demultiplexing block 8 which performs the operations inverse to those of the multiplexer 2 of the base station. This block 8 outputs for each transport channel i ($1 \leq i \leq X$) a stream $a'_i$ of estimates (softbits or hardbits) of the symbols of the stream $a_i$. These estimates $a'_i$ are delivered to the processing circuit of the TrCH i belonging to the block 9. The sequencing and parameterization of blocks 7, 8, 9 is catered for by a control unit 10 of the terminal.

As is usual in the field of digital radiocommunications, the blocks 1–3,5 of the base station and 7–10 of the terminal can be embodied by programming one or more digital signal processors and/or by using specific logic circuits.

Figure 4:
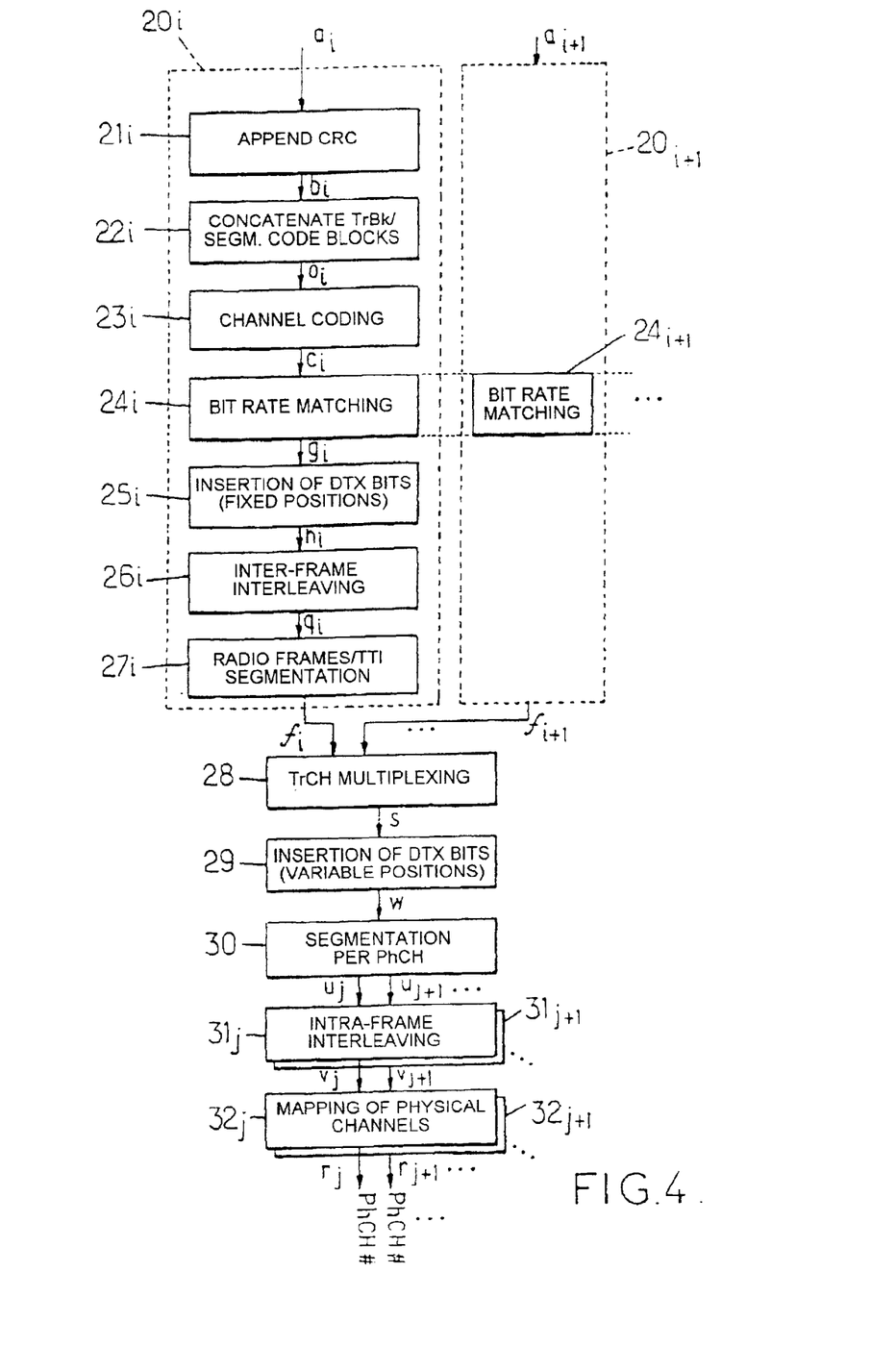
FIGS. 4 and 5, commented on earlier, are schematic diagrams of the multiplexing and demultiplexing blocks of the base station and of the terminal according to FIGS. 2 and 3.
Figure 5:
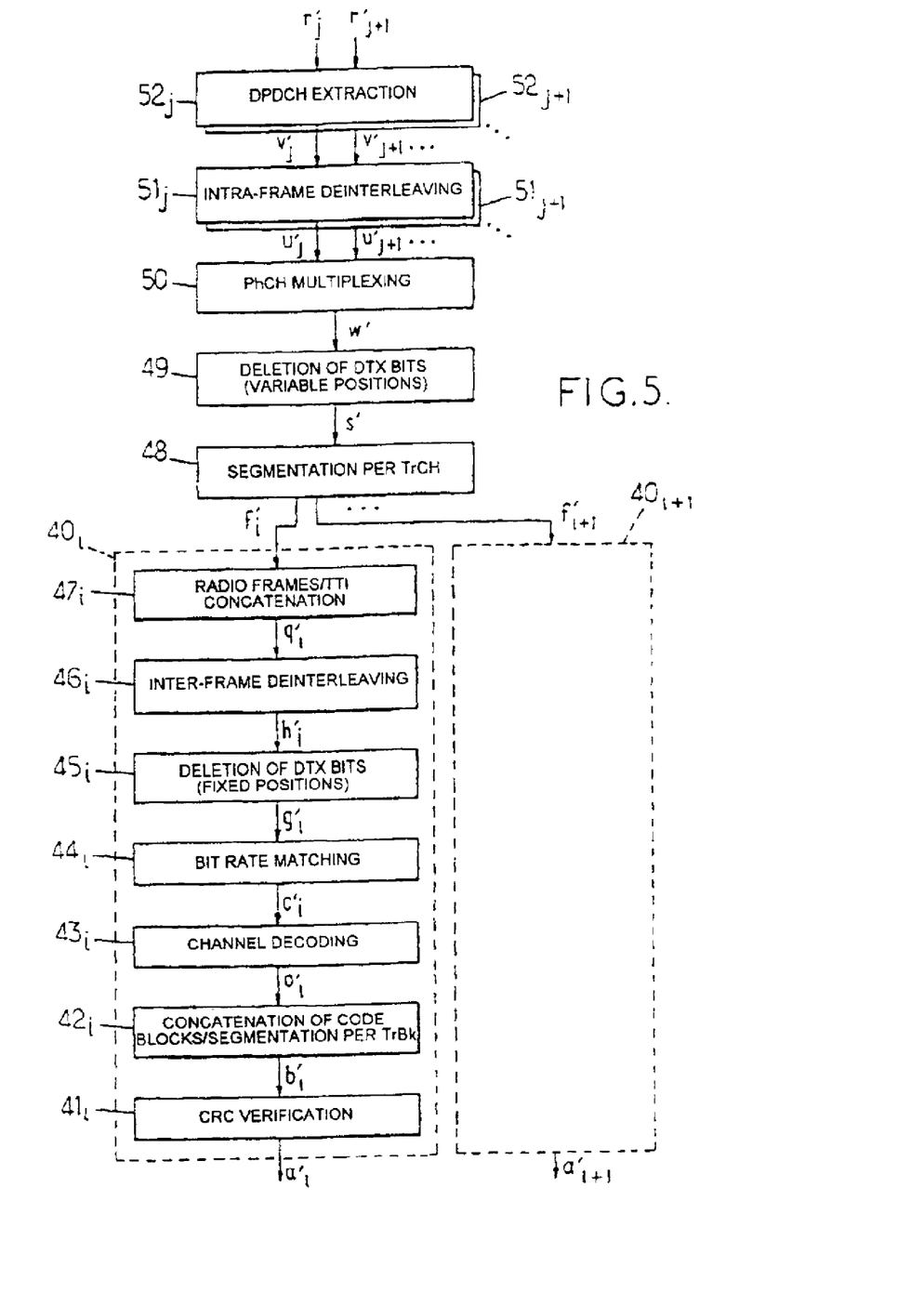

FIGS. 4 and 5 respectively detail the various functional modules of the multiplexing block 2 and demultiplexing block 8 (see the aforesaid specification 3G TS 25.212). In these figures, the references bearing the index i ($1 \leq i \leq X$) designate the elements referring to TrCH i (blocks $20_i$ and $40_i$), the references bearing the index j designating the elements referring to PhCH j ($1 \leq j \leq Y$), and the references with no index referring to the operations performed for each frame at CCTrCH level.

The stream $a_i$ to be transmitted on each TRCH i is composed of binary symbols output in the form of successive transport blocks TrBk. The module $21_i$ completes each TrBk by adding thereto a cyclic redundancy code CRC, serving to detect any transmission errors. The TrBk $b_i$ are then concatenated and/or segmented by the module 22, so as to form blocks $o_i$ of appropriate size for the input of the channel coder $23_i$.

For each TTI of transport channel i, the channel coder $23_i$ outputs a sequence $c_i$ of $E_i$ coded bits denoted $c_{i,m}$ ($1 \leq m \leq E_i$). Two types of error correcting code may be applied by the module $23_i$:

- a convolutional code of rate ½ or ⅓ and of constraint length K=9;
- a turbo code of rate ⅓ for the applications which require the lowest error rates. In this case, the bits $c_{i,3p+q}$ of the output sequence from the coder are systematic bits (copies of the input blocks $o_i$) if q=1, and parity bits if q=2 or 0.

The bit rate matching modules $24_i$ delete (puncture) or repeat bits of the sequences $c_i$ so as to match the bit rate of the TrCHs to the global bit rate allowable on the PhCH or PhCHs given their spreading factors. For each TTI on TrCH i, there is defined, from the information provided by the higher protocol layers, a parameter $\Delta N_i^{TTI}$, negative in the case of puncturing and positive in the case of repetition. The sequence $g_i$ produced by the module $24_i$ for the TTI is composed of $G_i = E_i + \Delta N_i^{TTI}$ bits denoted $g_{i,n}$ ($1 \leq n \leq G_i$). In the case where the module $23_i$ has used a turbo code, the puncturing applied by the module $24_i$ if $\Delta N_i^{TTI} < 0$ is limited to the parity bits, given the greater importance of the systematic bits to the decoder.

In a given frame, the periods devoted to the various TrCHs of the communication may have fixed positions (before the intra-frame interleaving mentioned below) or variable positions. In the case of fixed positions, it may be necessary to append to the sequence $g_i$, by means of the module $25_i$, one or more marked symbols which will not be transmitted (the value of the corresponding bit will for example be set to zero instead of ±1 in the output stream $r_j$ comprising such a symbol so that the transmission power of the symbol is zero). The DTX ("Discontinuous Transmission") bits thus marked are denoted "δ". In the exemplary implementation considered here in a nonlimiting manner, each symbol $h_{i,n}$ of the sequence $h_i$ output by the module $25_i$ ($0 \leq n \leq F_i.H_i$, with $G_i \leq F_i.H_i$) is represented by two bits:

$h_{i,n} = (0, g_{i,n})$ if $n \leq G_i$;

$h_{i,n} = (1, 0)$ if $G_i < n \leq F_i.H_i$ (marked bits "δ").

The interleaving module $26_i$ performs a permutation of the sequence $h_i$, with a view to distributing the symbols pertaining to the TTI over the $F_i$ frames which it covers. This interleaving consists in writing the symbols of the sequence $h_i$ successively into the rows of a matrix comprising $F_i$ columns, in permuting the columns of the matrix, and in then reading the symbols of the matrix column by column to form the sequence denoted $q_i$. The module $27_i$ then chops the sequence $h_i$ into $F_i$ segments of consecutive symbols corresponding to the $F_i$ columns of the interleaving matrix after permutation, and respectively assigns these segments to the $F_i$ frames of the TTI to form a sequence denoted $f_i$ for each frame and each TrCH i ($1 \leq i \leq X$).

In accordance with the specification 3G TS 25.212, the permutation of columns performed by the interleaver $26_i$ is such that the symbol $h_{i,n}$ is found in the frame of rank $n_i = BR(n-1, F_i)$ of the TTI, the frames of the TTI being numbered from $n_i = 0$ to $n_i = F_i - 1$, and $BR(x, 2^y)$ being defined as the integer whose representation to the base 2 corresponds to the reading in the reverse direction of the representation to the base 2 on y digits of the remainder from the Euclidean division of x by $2^y$ (for example BR(51, 8)=BR(3, 8)=BR($[011]_2$, $2^3$)=$[110]_2$=6,.

The sequences $f_i$ produced for the various TrCHs of the communication ($1 \leq i \leq X$) are multiplexed, that is to say placed one after the other, by a module 28 forming a sequence s of S symbols for the CCTrCH. In the case where the periods devoted to the various TrCHs of the communication have variable positions, it may be necessary to append to the sequence s, by means of the module 29, one or more marked symbols "δ". In the exemplary implementation considered here, each symbol $w_k$ of the sequence w output by the module 29

$$\left(1 \leq k \leq \sum_{j=1}^{Y} U_j, \right.$$

with $$S \leq \sum_{j=1}^{Y} U_j$$

and $U_j$ equal to the number of bits per frame on the DPDCH of physical channel j, which number depends on the spreading factor allocated to the channel) is represented by two bits:

$w_k=(0, s_k)$ if $k \leq S$;
$w_k=(1, 0)$ if $$S < k \leq \sum_{j=1}^{Y} U_j.$$

The module 30 subsequently chops the sequence w into Y segments of $U_1, U_2, \ldots, U_Y$ consecutive symbols, and respectively assigns these segments to the Y PhCHs to form a sequence denoted $u_j$ for each PhCH j ($1 \leq j \leq Y$). The interleaving module $31_j$ performs a permutation of the sequence $u_j$ with a view to distributing the symbols, within the current frame, over the Y PhCHs employed by the communication. This interleaving consists in writing the symbols of the sequence $u_j$ successively to the rows of a matrix comprising thirty columns, in permuting the columns of the matrix, and in then reading the symbols of the matrix column by column to form the sequence, denoted $v_j$, of $U_j$ symbols.

The module $32_j$ for mapping the physical channel finally distributes the successive symbols of the sequence $v_j$ into the fields DATA1 and DATA2 of the time slots of the current frame. The module $32_j$ can translate the information bits with values 0 or 1 into signed bits (±1), and assign the value 0 to the marked bits "δ". It furthermore supplements the stream $r_j$ addressed to the block 3 by inserting the appropriate signalling bits into the fields PL, TFCI and TPC of the DPCCH.

The demultiplexing block 8 comprises modules which perform, in the reverse direction, the operations which are dual to those of the modules $20_i$–$32_j$ of the multiplexing block 2. In FIG. 5, the primed references correspond to the estimates of the symbols bearing the same unprimed references in FIG. 4. For the symbols composed of two bits formatted as indicated hereinabove by reason of the marking of the bits "δ", these estimates (softbits) refer to the least significant bit.

For each 10 ms frame and each PhCH, the module $52_j$ extracts the sequence $v'_j$ of $U_j$ softbits pertaining to the DPDCH from the fields DATA1 and DATA2 of the demodulated signal. The deinterleaving module $51_j$ applies the inverse permutation to that of the module $31_j$ to this sequence $v'_j$ so as to restore the sequence of softbits $u'_j$. The Y sequences $u'_j$ are placed end to end by the multiplexing module 50 so as to form the sequence of softbits w' which relates to the CCTrCH. In the case where the TrCH have variable positions, the module 49 deletes the last $$\sum_{j=1}^{Y} U_j - S$$

softbits of the sequence w', which correspond to "δ" bits. The softbit sequence s' produced by the module 49 is chopped by the segmentation module 49 into X subsequences $f'_i$ respectively assigned to the TrCHs.

For each TrCH i whose TTI comprises several frames ($F_i>1$), the module $47_i$ concatenates the subsequences produced in relation to the various frames so as to form the sequence $q'_i$ subjected to the inter-frame deinterleaving module $46_i$. The latter carries out the permutation inverse to that of the module $26_i$ so as to restore the sequence of softbits $h'_i$. In the case where the TrCHs have fixed positions, the module $45_i$ deletes the $F_i.H_i-G_i$ last softbits of the sequence $h'_i$, which correspond to "δ" bits. The sequence of softbits s' produced by the module 49 is then processed by the bit rate matching module $44_i$ which performs the following operations:

insertion of a null softbit (minimum likelihood) in place of each bit which has been punctured on transmission;

reevaluation of each softbit corresponding to a bit which has been repeated on transmission, so as to sharpen the likelihood thereof.

The output sequence $c'_i$ of the module $44_i$ is decoded by the module $43_i$ so as to correct any transmission errors. The symbols of the decoded blocks $o'_i$ output by the module $43_i$ can be softbits, or hardbits if the likelihood measures are no longer required in the subsequent processing. On the basis of these blocks $o'_i$, the module $42_i$ reconstructs the estimated TrBk $b'_i$, and the module $41_i$ verifies the integrity of the CRC so as to validate these TrBk in the output stream $a'_i$ relating to TrCH i.

In the UMTS system, in particular in FDD mode, there is provision for the communicating terminals to be furnished with time windows so as to listen to one or more carrier frequencies different from that supporting the communication. This listening procedure allows in particular the terminals equipped with a single radio frequency receiver to perform measurements of radio parameters (module 11 of FIG. 3) with a view to possible automatic transfer (handover):

from a UMTS FDD cell to another UMTS FDD cell using a different carrier;

from a UMTS FDD cell to a UMTS TDD cell ("Time Domain Duplex"); or else from a UMTS FDD cell to a cell of a second-generation network such as a GSM network.

During the listening window, which may extend over one or more time slots of 666 μs, the base station interrupts its transmission to the terminal. This interruption is specific to the air interface, and has no impact on the output bit rate of the sources of the block 1 which relate to the various TrCHs. In the course of each 10 ms frame having an inactive period (during which no symbol is transmitted), it is therefore necessary, outside of this inactive period, to increase the transmission bit rate on the Y PhCHs.

These frames are said to use a compressed mode. In order for the quality in terms of binary error rate (BER) or of frame error rate (FER) not to be affected by the interruption of transmission, the base station transmission power is increased in the compressed-mode frames outside of the inactive period.

The interruptions of transmission can take place periodically or on request. In the course of a given frame, the number of time slots covered by the inactive period is a maximum of 7. The illustration of FIG. 1 shows two interruptions of transmission GAP1, GAP2. The interruption GAP1 falls within a single compressed-mode frame T1, while the interruption GAP2 straddles two compressed-mode frames T2, T2'. Interruptions extending over two consecutive frames, such as GAP2, are useful in particular for handovers to the GSM networks requiring a measurement window of 6 ms.

As indicated in the aforesaid specification 3G TS 25.212, an interruption going from slot $N_{first}$ to slot $N_{last}$ begins at the TFCI or DATA2 field of the slot $N_{first}$, and terminates at the field DATA2 of slot $N_{last}$. In both cases, the modules $32_j$ of the multiplexing block 2 generate the inactive period of the compressed-mode frame by placing the information bits in the remaining DATA1 and DATA2 fields.

In compressed mode, two methods A and B can be used to match the bit rate of the PhCHs to that of the TrCHs.

Method A consists in an additional puncturing (relative to that which may be applied by the bit rate matching module $24_i$), serving to create the interruption of transmission in each frame concerned.

Method B consists in dividing by 2 the Y spreading factors employed in the compressed-mode frames. A limitation of this method B is that it requires the availability of spreading codes of half factor, thereby penalizing the code resources in the cell.

Method A poses a problem when the communication uses at least one TrCH whose transmission time interval covers several frames ($F_i>1$): if one of these frames is in compressed mode, then the additional puncturing must be carried out specifically in this frame, this being tricky given the interleaving applied by the modules $26_i$ and the shifts generated in the sequence of symbols by the bit rate matching module $24_i$. An additional constraint in the case where a turbo code is used for the channel coding on a TrCH is that it is not desirable to puncture systematic bits.

Accordingly, the compressed mode according to method A requires a priori fairly significant modifications to the multiplexing and demultiplexing suite according to FIGS. 4 and 5, and hence an increase in the complexity of the base stations and terminals, which must naturally be compatible both with the compressed mode and with the noncompressed mode.

An aim of the present invention is to limit the impact of these problems in the systems using a processing suite of the kind described above.

SUMMARY OF THE INVENTION

The invention thus proposes a method of processing X streams of information symbols to be transmitted on Y communication channels, X and Y being positive integers, in which the Y communication channels simultaneously occupy a transmission resource organized as successive frames, in which the successive frames include compressed-mode frames having at least one inactive period during which no symbol is transmitted, in which the information symbols of each stream i ($1 \leq i \leq X$) are transmitted in the course of successive transmission time intervals each comprising $F_i$ consecutive frames, $F_i$ being a positive integer, and in which, for each transmission time interval relating to a stream i ($1 \leq i \leq X$), integers $E_i$, $\Delta N_i^{TTI}$ and $\Delta N_i^{cm}$ are defined such that $E_i>0$, $\Delta N_i^{cm}<0$ if the said transmission time interval comprises at least one compressed-mode frame and $\Delta N_i^{cm}=0$ if the said transmission time interval does not comprise any compressed-mode frame. The method comprises the following steps for each transmission time interval relating to a stream i ($1 \leq i \leq X$):

forming a first sequence of $E_i$ symbols coded on the basis of information symbols of the said stream pertaining to the said transmission time interval;

forming a second sequence of symbols including $E_i+\Delta N_i^{TTI}+\Delta N_i^{cm}$ symbols extracted from the first sequence and $-\Delta N_i^{cm}$ marked symbols;

forming a third sequence of symbols by a permutation of the symbols of the second sequence;

distributing the symbols of the third sequence into $F_i$ segments of consecutive symbols, the $F_i$ segments being respectively assigned to the frames of the said transmission time interval; and for each frame of the said transmission time interval, forming a fourth sequence of symbols extracted from the segment assigned to the said frame, the said permutation and the placing of the marked symbols in the second sequence when the said transmission time interval comprises at least one compressed-mode frame being such that each marked symbol belongs, in the third sequence, to a segment assigned to a compressed-mode frame, and the following steps for each frame:

forming a fifth sequence of symbols including the symbols of the fourth sequence output for the said frame in relation to each stream;

distributing the symbols of the fifth sequence into Y segments of symbols, the Y segments being respectively assigned to the Y communication channels;

for each communication channel, forming a sixth sequence of symbols extracted from the segment assigned to the said communication channel;

for each communication channel, forming a seventh sequence of symbols by a permutation of the symbols of the sixth sequence; and transmitting on each communication channel, in time slots of the said frame, symbols extracted from the seventh sequence, each of the said marked symbols being deleted before transmission on each communication channel when the said frame is in compressed mode, so as to husband the said inactive period in the course of the frame.

The $-\Delta N_i^{cm}$ marked symbols correspond to those to which the additional puncturing is applied within the framework of method A mentioned above. The use of a marking makes it possible not to actually puncture them at the bit rate matching level, so as to avoid having to modify the interleaving and segmentation modules $26_i$, $27_i$, and possibly the other modules of the processing suite. This results in a simplification of the communicating entities since these same modules may be used in the same way in compressed mode and in noncompressed mode.

In a preferred mode of execution of the process, the said marked symbols are kept until the seventh sequences when the frame is in compressed mode, without being extracted from the seventh sequences for transmission. In the application described earlier, this makes it possible not to modify any of the modules $26_i$ to $31_j$ of the suite of FIG. 4, nor any of the modules $46_i$ to $51_j$ of the suite of FIG. 5.

The process is compatible with the use of the DTX bits, as described earlier. For this purpose, it is sufficient to insert additional marked symbols, kept until the seventh sequences so as to be transmitted with zero transmission power, into the second or the fifth sequence. It is noted that the insertion of the $-\Delta N_i^{cm}$ marked symbols for the additional puncturing can be performed either before, or after the insertion of the DTX bits in the case where the TrCHs have fixed positions, that is to say before or after module $25_i$.

Another aspect of the present invention relates to a device adapted to the implementation of the above method, comprising means for forming a first sequence of $E_i$ coded symbols on the basis of information symbols of each stream i ($1 \leq i \leq X$) pertaining to a transmission time interval;

means for forming, for each transmission time interval relating to a stream i ($1 \leq i \leq X$), a second sequence of symbols including $E_i+\Delta N_i^{TTI}+\Delta N_i^{cm}$ symbols extracted from the first sequence and $-\Delta N_i^{cm}$ marked symbols;

means for forming a third sequence of symbols by a first permutation of the symbols of each second sequence;

means for distributing the symbols of each third sequence, which is formed for a transmission time interval relating to a stream i ($1 \leq i \leq X$), into $F_i$ segments of consecutive symbols respectively assigned to the frames of the said transmission time interval, and for forming $F_i$ fourth sequences of symbols respectively extracted from the segments assigned to the said frames;

means for forming, for each frame, a fifth sequence of symbols including the symbols of the fourth sequence output for the said frame in relation to each stream i ($1 \leq i \leq X$);

means for distributing the symbols of each fifth sequence into Y segments of symbols respectively assigned to the Y communication channels;

means for forming a sixth sequence of symbols extracted from the segment assigned to each communication channel; and means for forming a seventh sequence of symbols by a second permutation of the symbols of each sixth sequence, and for transmitting, in time slots of each frame on each communication channel, symbols extracted from the seventh sequence c and the said communication channel, in which the first permutation and the placing of the marked symbols in the second sequence, which is formed for a transmission time interval relating to a stream i($1 \leq i \leq X$) when the said transmission time interval comprises at least one compressed-mode frame, are such that each marked symbol belongs, in the third sequence which is formed for the said transmission time interval, to a segment assigned to a compressed-mode frame, each of the said marked symbols being deleted before transmission on each communication channel so as to husband the said inactive period in the course of the frame.

This device can in particular form part of a UMTS base station such as described hereinabove. The invention also has an impact at the level of the terminals, whose demultiplexing suite must be adapted.

Another aspect of the invention thus relates to a method of processing Y digital streams obtained on the basis of a signal received and comprising estimates of information symbols respectively transmitted along Y communication channels simultaneously occupying a transmission resource organized as successive frames, and pertaining to X transport channels, X and Y being positive integers, in which the successive frames include compressed-mode frames having at least one inactive period during which no symbol is transmitted, and in which the estimates of information symbols pertaining to each transport channel i ($1 \leq i \leq X$) are received in the course of successive transmission time intervals each comprising $F_i$ consecutive frames, $F_i$ being a positive integer. This method comprises the following steps for each frame:

forming, in relation to each communication channel j ($1 \leq j \leq Y$), a first sequence composed of estimates extracted from the time slots of the said frame and, when the said frame is in compressed mode, of marked estimates placed at positions corresponding to the inactive period of the said frame;

for each communication channel, forming a second sequence of estimates by a permutation of the estimates of the first sequence;

forming a third sequence of estimates including estimates of the second sequence which is output for each communication channel; and distributing the estimates of the third sequence into X segments of consecutive estimates, the X segments being respectively assigned to the X transport channels, and the following steps for each transmission time interval relating to a transport channel i($1 \leq i \leq X$):

forming a fourth sequence by concatenating the respective segments assigned to the said transport channel for the frames of the said transmission time interval;

permuting the estimates of the fourth sequence and forming a fifth sequence of estimates extracted from the fourth permuted sequence;

ignoring each marked estimate of the fifth sequence, and forming a sixth sequence of symbols on the basis of the other estimates of the fifth sequence; and decoding the sixth sequence of estimates and outputting the decoded estimates.

The DTX bits can be taken into account without any problem. In the case where the TrCHs have variable positions in the frame, the formation of the third sequence then comprises a concatenating of the second sequences which are formed for the Y communication channels and a deleting of at least one estimate having a determined position in the concatenated sequence. In the case where the TrCHs have fixed positions in the frame, the formation of the fifth sequence for the one transmission time interval including this frame in relation to a transport channel comprises a deleting of at least one estimate having a determined position in the fourth permuted sequence.

The invention also proposes a device adapted to the implementation of this method, which can form part of a UMTS terminal, and comprising:

means for forming, for each frame in relation to each communication channel, a first sequence composed of estimates extracted from the time slots of the said frame and, when the said frame is in compressed mode, marked estimates placed at positions corresponding to the inactive period of the said frame;

means for forming, for each frame in relation to each communication channel, a second sequence of estimates by permutation of the estimates of the first sequence;

means for forming, for each frame, a third sequence of estimates including estimates of the second sequence which is output for each communication channel;

means for distributing the estimates of the third sequence formed for each frame into X segments of consecutive estimates, the X segments being respectively assigned to the X transport channels;

means for forming a fourth sequence for each transmission time interval relating to a transport channel, by concatenating the respective segments assigned to the said transport channel for the frames of the said transmission time interval;

means for permuting the estimates of the fourth sequence which is formed for each transmission time interval relating to a transport channel i, and for forming a fifth sequence of estimates extracted from the fourth permuted sequence;

means for deleting each marked estimate of the fifth sequence which is formed for each transmission time interval relating to a transport channel i, and for forming a sixth sequence of symbols on the basis of the other estimates of the fifth sequence; and means for decoding the sixth sequence of estimates which is formed for each transmission time interval relating to a transport channel, so as to output the decoded estimates.

DESCRIPTION OF PREFERRED EMBODIMENTS

The invention is described hereinbelow within the context described earlier of the UMTS downlinks in FDD mode. In the examples considered below, the modifications made by the invention occur essentially at the level of the bit rate matching modules $24_i$, $44_i$ and of the modules $32_j$, $52_j$ for interfacing with the PhCHs.

Figure 6:
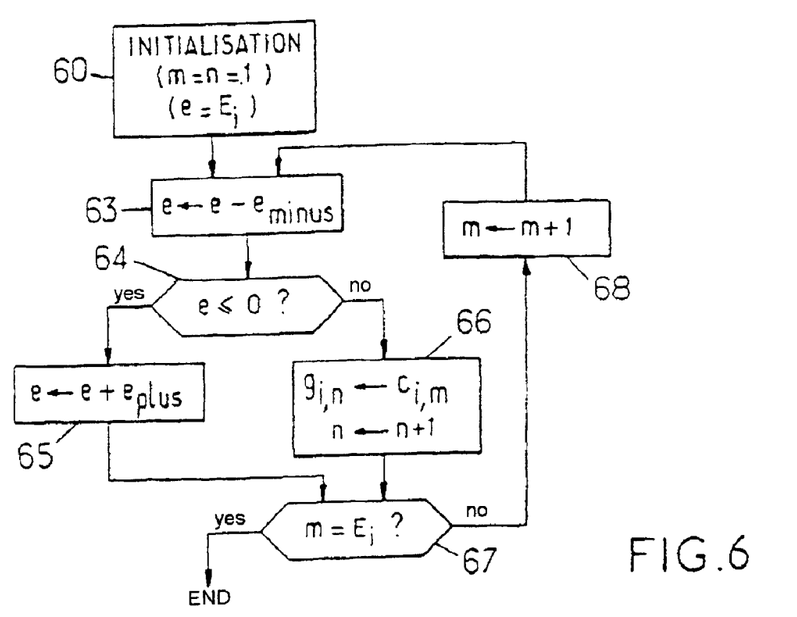
FIGS. 6 and 7 are flow charts of procedures which can be used to carry out the bit rate matching on the TrCHs in the multiplexing block according to FIG. 4, in the case of the use of a convolutional code.
Figure 7:
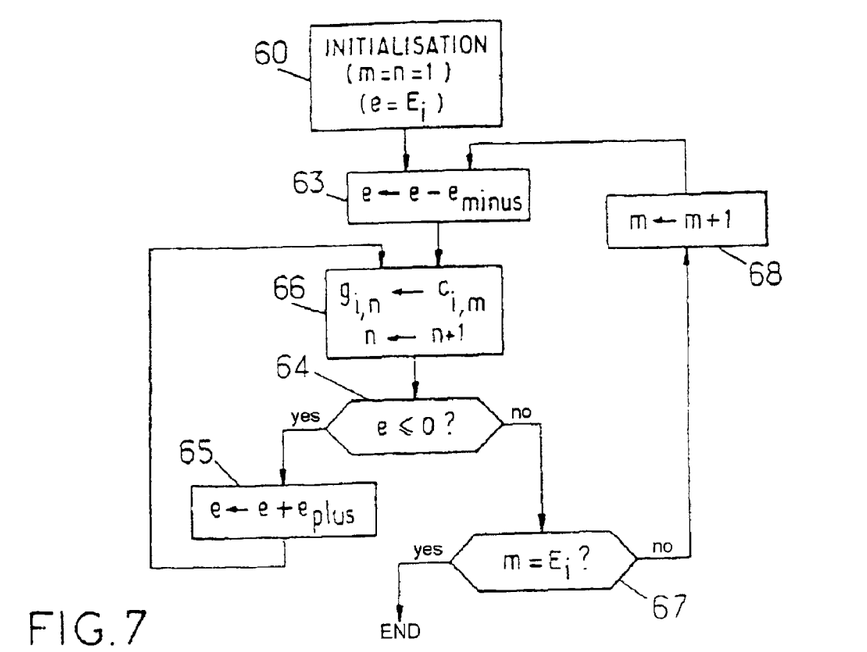

We firstly consider the case of a TrCH i ($1 \leq i \leq X$) for which the module $23_i$ applies a convolutional code. In this case, the output bits from the coder all have the same relative importance to the decoder. FIGS. 6 and 7 show an exemplary embodiment of the procedures applied by the bit rate matching module $24_i$ in the case of a puncturing and of a repetition of bits, respectively.

These procedures use parameters $e_{plus}$ and $e_{minus}$ defined as a function of the numbers of bits $E_i$, $G_i$ at the input and at the output of the module $24_i$, with $G_i < E_i$ in the case of puncturing (FIG. 6), and $G_i > E_i$ in the case of repetition (FIG. 7). The values of these parameters are:

$$e_{plus} = a \cdot E_i$$
$$e_{minus} = a \cdot |G_i - E_i| = a \cdot |\Delta N_i^{TTI}|$$

with a=2. The numbers $E_i$, $G_i$ are determined as a function of the information provided by the higher protocol layers as described in the specification 3G TS 25.212. The variation in the number of bits, due to the static bit rate matching is denoted $\Delta N_i^{TTI}$. In noncompressed mode, we have $\Delta N_i^{TTI} = G_i - E_i$. Within the notation used in FIGS. 6 and 7, m designates the index of the symbols $c_{i,m}$ in the input sequence $c_i$ ($1 \leq m \leq E_i$), n designates the index of the symbols $g_{i,n}$ in the output sequence $g_i$ ($1 \leq n \leq G_i$), and e designates a counter decremented and incremented to ensure a regular apportioning of the punctured or repeated bits. We take m=n=1 and e=$E_i$ on initializing 60 the procedure.

A loop is executed for the successive values of the index m, lying between 1 and $E_i$. Each iteration in this loop begins with the decrementing 63 of the counter e by the value $e_{minus}$. The bit $c_{i,m}$ is punctured or repeated whenever $e \leq 0$ during the test 64, in which case the counter e is incremented in step 65 by the value $e_{plus}$.

In the case of puncturing (FIG. 6), the test 64 is performed just after the decrementing 63 of the counter e in each iteration. When e>0 in the test 64, the bit $c_{i,m}$ should not be punctured, and step 66 is executed so as to place this bit $c_{i,m}$ in position n in the output sequence $g_i$ and to increment the index n by one unit. The iteration terminates with the end of loop test 67 after step 65 or 66. The bit rate matching procedure is terminated when m=$E_i$. Otherwise, m is incremented by one unit in step 68 before returning to step 63 for the next iteration.

The procedure is similar for repetition (FIG. 7), with the following differences:

the step 66 of placing the bit $c_{i,m}$ in the output sequence and of incrementing the index n precedes the test 64 pertaining to the sign of the counter e;

this step 66 is executed for all the bits of the input sequence (after step 63), and re-executed whenever a bit must be repeated (after step 65);

when the bit has been repeated sufficiently (e >0 in test 64), the iteration terminates with the end of loop test 67.

The invention proposes to adapt the procedures of FIGS. 6 and 7 to the case of the compressed mode, with a minimum impact on the remainder of the multiplexing suite. This is performed by placing marked bits "p" at judiciously chosen positions in the input sequence of the inter-frame interleaver $26_i$ for each TrCH i.

In the implementation considered above, this marking can consist in replacing each "p" bit by the two-bit symbol (1, 1), which remains available when the marking (1, 0) is reserved for the "δ" bits. It will however be observed that the marking of the "p" bits could be the same as that of the "δ" bits.

The marking of the "p" bits before the interleaver $26_i$ makes it possible to carry out downstream in the suite the additional puncturing required by the compressed modes. Preferably, this additional puncturing is performed at the level of the modules $32_j$ relating to the Y PhCH: these modules tag the "p" marked bits, position them at the level of the required interruption and do not transmit them to the radio stage 4 (or transmit bits set to zero instead of signed bits). This makes it possible to use the modules $25_i$ to $31_j$ in the same way in compressed mode and in noncompressed mode.

At the level of the receiver terminal, the modifications to be made in order to support the compressed mode are also minor:

for each frame and each PhCH j, the extraction module $52_j$ completes the softbits r'$_j$ by placing marked softbits at the positions corresponding to the "p" marked bits. These marked softbits "p" have a particular value which is not employed for the other softbits, for example 0xFF for softbits of a byte. The positions of the softbits to be marked are immediately determinable: they correspond to the DATA1 and DATA2 fields not transmitted during the interruption when the frame is in compressed mode. The number $N_j^{TGL}$ of marked softbits "p" is simply the difference between the number of bits processed on channel j in a frame in noncompressed mode and the number of bits processed in channel j in the current frame ($N_j^{TGL} > 0$ in compressed mode, and $N_j^{TGL} > 0$ in noncompressed mode);

the modules $51_j$ to $45_i$ work in the same way in noncompressed mode and in compressed mode;

at the input of the bit rate matching modules $44_i$, which operate as described earlier, the marked softbits "p" are detected and deleted from the sequence g'$_i$. The module $44_i$ does not need to know a priori the positions of the bits of the TrCH i which have undergone the additional puncturing;

the modules $43_i$ to $41_i$ work in the same way in noncompressed mode and in compressed mode.

The number of bits of TrCH i per frame after the static bit rate matching is denoted $Nfr_i = (E_i + \Delta N_i^{TTI})/F_i$, and the number of bits having to be marked "p" in frame $n_i$ belonging to the TTI of this TrCH ($0 \leq n_i \leq F_i$) is denoted $-\Delta N^{cm}[n_i]$. In compressed mode, the positive number $-N^{cm}[n_i]$ depends on the position and on the duration of the interruption in the course of frame $n_i$ of the TTI, on spreading factors pertaining to the Y physical channels and on the amounts of static bit rate matching already carried out in the X TrCH of the communication. When the frame is not in compressed mode, $\Delta N^{cm}[n_i]=0$. The total number $-\Delta N_i^{cm}$ of bits of the TTI to be marked "p" is given by $$\Delta N_i^{cm} = \sum_{n_i=0}^{F_i-1} \Delta N^{cm}[n_i].$$

Finally, the sequence $g_i$ of $G_i$ bits which is output for the TTI by the module $24_i$ comprises $E_i+\Delta N_i^{TTI}+\Delta N_i^{cm}$ symbols representing bits extracted from sequence $c_i$ and $-\Delta N_i^{cm}$ marked symbols "p".

A first manner of proceeding at the level of the base station (method 1 hereinbelow) consists, for each TrCH and each TTI of this TrCH comprising at least one frame in compressed mode, in identifying the bits which will be found in the compressed-mode frame or frames after the other operations, in particular of interleaving, executed in the multiplexing suite. An algorithm of the same kind as that of FIG. 6 is then executed on these identified bits so that some of them are marked "p".

Figure 8:
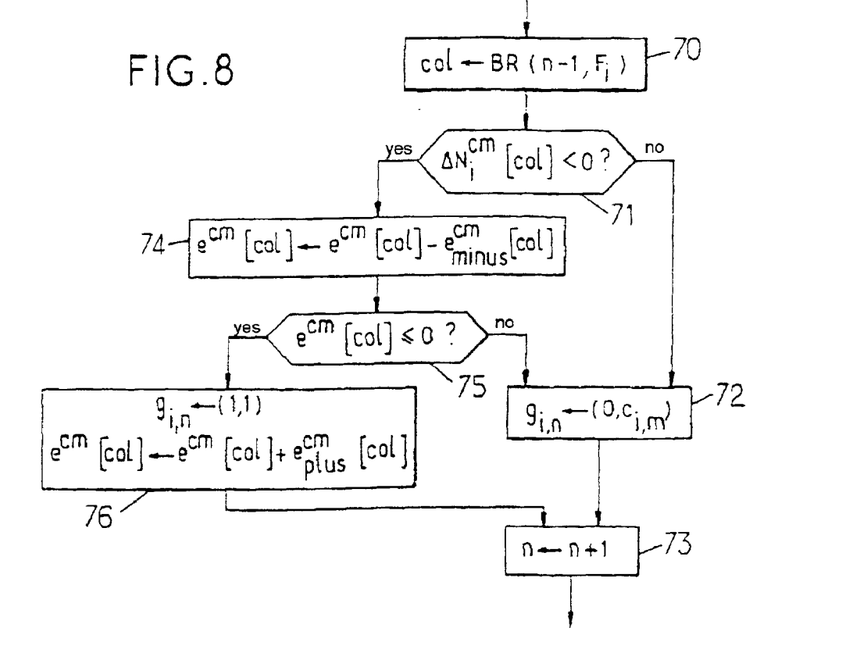
FIGS. 8 and 9 are flow charts respectively showing modifications made to the procedures of FIGS. 6 and 7 in accordance with two embodiments of the invention.

FIG. 8 illustrates an embodiment according to this method 1, showing steps 70–76 replacing step 66 in the procedure according to FIG. 6 or 7. The parameters $e_{plus}$ and $e_{minus}$ for the bit rate matching are defined as earlier ($e_{plus}=a.E_i$ and $e_{minus}=a.|\Delta N_i^{TTI}|$), and parameters of the same nature are moreover defined for the additional puncturing in each TrCH i and each frame $n_i$ belonging to the TTI of this TrCH:

$$e_{plus}^{cm}[n_i] = a' \cdot Nfr_i$$

$$e_{minus}^{cm}[n_i] = -a' \cdot \Delta N^{cm}[n_i]$$

with a'=2 (for example), and additional counters $e^{cm}[n_i]$ are initialized to $Nfr_i$ in step 60. In step 70, the index col of that frame of the TTI in which the symbol $g_{i,n}$ will be found (column of the interleaver $26_i$ after permutation) is calculated using the function BR defined earlier. If this frame is not in compressed mode ($\Delta N^{cm}[col]=0$ in test 71), the symbol $g_{i,n}$ receives the value $(0, c_{i,m})$ in step 72, then the index n is incremented by one unit in the final step 73. If the frame is in compressed mode ($\Delta N^{cm}[col]<0$ in test 71), the counter $e^{cm}[col]$ is decremented by the value $e^{cm}_{minus}[col]$. When $e^{cm}[col] \leq 0$ during test 75, the symbol $g_{i,n}$ is marked "p" in step 76 (the bit $c_{i,m}$ will be punctured), in which case the counter $e^{cm}[col]$ is incremented by the value $e^{cm}_{plus}[col]$ before incrementing the index n in the final step 73. When $e^{cm}[col]>0$ during test 75, the module 24 goes to the aforesaid step 72 to assign the value $(0, c_{i,m})$ to the symbol $g_{i,n}$ which will be kept in the compressed-mode frame.

Another way of proceeding at the base station level (method 2 hereinbelow) consists, for each TrCH i and each TTI of this TrCH comprising at least one compressed-mode frame, in applying the bit rate matching algorithm according to FIG. 6 or 7 to the sequence of bits $c_i$, while taking into account, in the number $\Delta N_i$ of bits to be punctured or repeated, both the static bit rate matching ($\Delta N_i$TTI) and any possible compressed mode ($\Delta N_i^{cm}$), and in adding the $\Delta N_i^{cm}$ marked bits "p" into the first positions of the columns corresponding to compressed-mode frames. This makes it possible to optimize the distance between the punctured or repeated information bits. Four cases arise:

1) $\Delta N_i^{TTI}<0$, so that $\Delta N_i = \Delta N_i^{TTI} + \Delta N_i^{cm}<0$. The puncturing rate is simply increased.

2) $\Delta N_i^{TTI}<0$ and $\Delta N_i^{TTI}>0$ and $|\Delta N_i^{cm}|>\Delta N_i^{TTI}$ so that $\Delta N_i<0$. Despite the repetition due to the static bit rate matching, bits will nevertheless have to be punctured. Hence, nothing is repeated, $\Delta N$ bits are punctured and $-\Delta N_i^{cm}$ marked bits ("p") are inserted.

3) $\Delta N_i^{TTI}>0$ and $|\Delta N_i^{cm}|<\Delta N_i^{TTI}$ so that $\Delta N_i>0$. There is no need to puncture unique information bits. It is sufficient to repeat less than what is demanded by the static bit rate matching. Hence, $\Delta N$ bits are repeated and $-\Delta N_i^{cm}$ marked bits ("p") are inserted.

4) $\Delta N_i^{TTI}>0$ and $|\Delta N_i^{cm}|=\Delta N_i^{TTI}$ so that $\Delta N=0$. There is no need either to puncture or to repeat information bits. It is sufficient to insert $-\Delta N_i^{cm}$ marked bits ("p").

Figure 9:
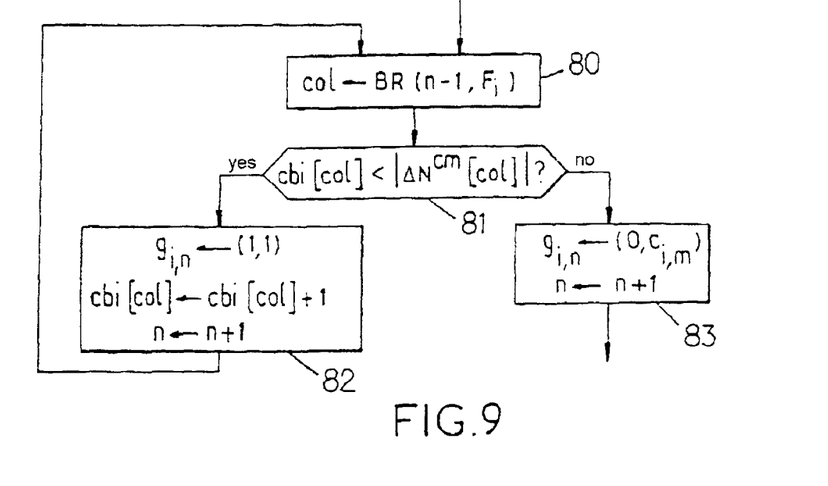

FIG. 9 illustrates an embodiment according to this method 2, by showing steps 80–83 replacing step 66 in the procedure according to FIG. 6 or 7. The parameters $e_{plus}$ and $e_{minus}$ for the bit rate matching are defined by:

$$e_{plus} = a \cdot E_i$$

$$e_{minus} = a \cdot |\Delta N_i^{TTI} + \Delta N_i^{cm}|$$

and $F_i$ additional counters $cbi[n_i]$ are used which enumerate the bits "p" inserted at the start of the columns of the interleaver ($0 \leq n_i < F_i$). These counters $cbi[n_i]$ are initialized to 0 in step 60. In step 80, the index col of that frame of the TTI in which the symbol $g_{i,n}$ will be found (column of the interleaver $26_i$ after permutation) is calculated using the function BR. If $cbi[col]<\Delta N^{cm}[col]$ (test 81), step 82 is executed so as to insert a bit "p" in position n of the output sequence $g_i$ and to increment the counter $cbi[col]$ and the index n by one unit, after which the module $24_i$ returns to step 80 for the next position. When $cbi[col]=\Delta N^{cm}[col]$ in test 81 (that is to say the frame is not in compressed mode since $\Delta N^{cm}[col]=0$, or all the bits "p" required have been introduced into the compressed-mode frame), the final step 83 is executed so as to write the bits $c_{i,m}$ (with the prefix 0) into the symbol $g_{i,n}$ and to increment the index n by one unit.

Figures 10, 11:
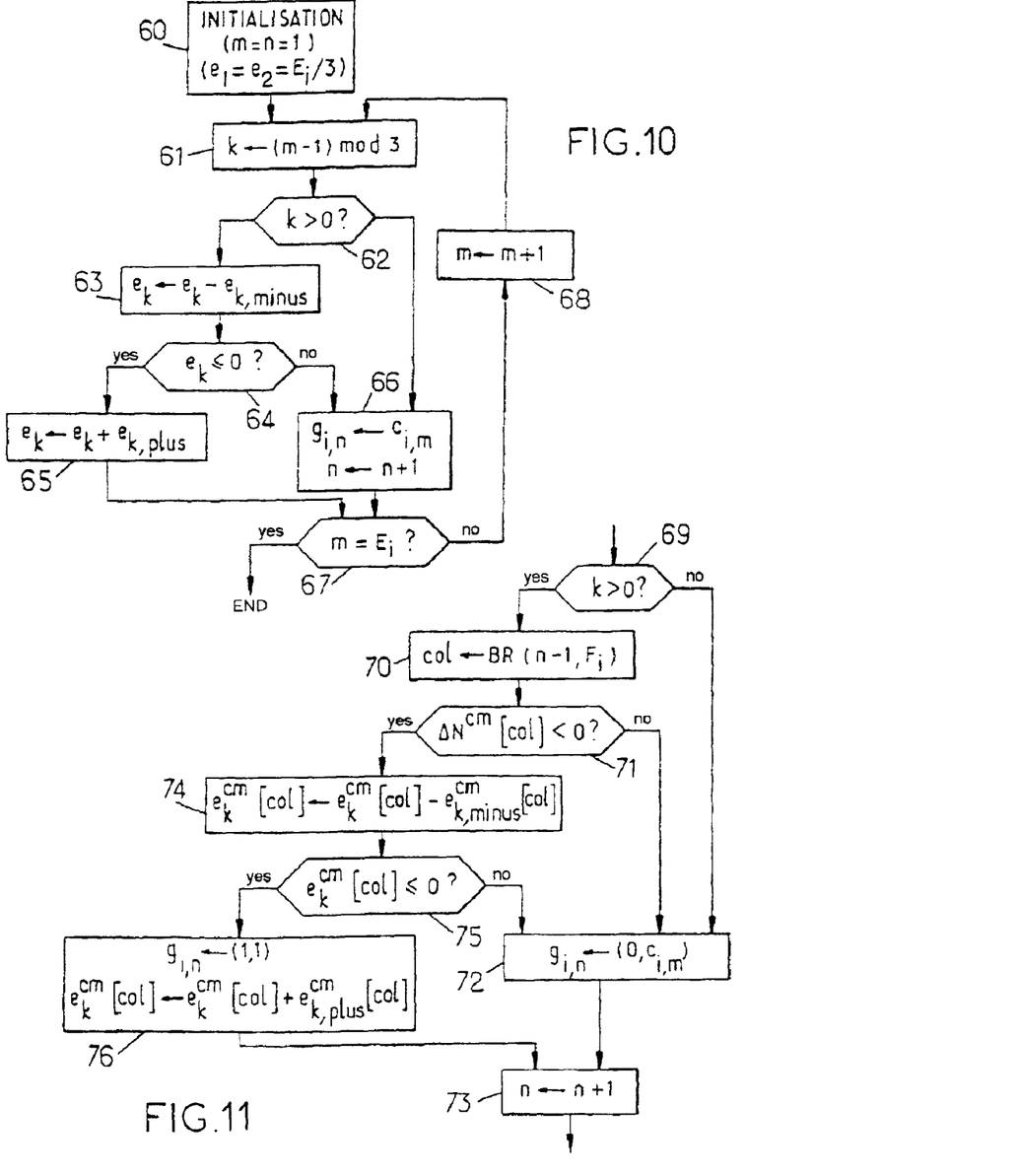
FIGS. 10 and 11 are flow charts similar to FIGS. 6 and 8 for the case where the information bits of the TrCH are protected by a turbo code.

In the case where the channel coding module $23_i$ uses a turbo code with the rate ⅓, the puncturing procedure is applied by the bit rate matching module $24_i$ only to the parity bits. This is illustrated by FIG. 10. The procedure is similar to that of FIG. 6, identical numeral references being employed to designate homologous steps.

The counter e of FIG. 6 is replaced by two counters $e_1$, $e_2$ assigned respectively to the bits $c_{i, 1+3\times+k}$ with k=1 and k=2. These two counters are initialized to $E_i/3$ in step 60. The processing of these counters calls upon parameters:

$$e_{k,plus} = a_k \cdot E_i / 3$$

$$e_{k,minus} = a_k \cdot |\Delta N_{k,i}^{TTI}|$$

with $a_i=2$ and $a_2=1$, $\Delta N_{i,i}^{TTI}$ and $\Delta N_{2,i}^{TTI}$ respectively designating the largest integer equal to or less than $\Delta N_i^{TTI}/2$ and the smallest integer equal to or less than $\Delta N_i^{TTI}/2$.

In step 61, the pointer k is determined for the current index m (this is the remainder of the Euclidean division of m-1 by 3). If k=0 (test 62), the bit $c_{i,m}$ is systematic and should not be punctured: we go to step 66. When k=1 or 2 in test 62, steps 63–66 are executed as in the case of FIG. 6 by manipulating the counter $e_k$ instead of the counter e so as to puncture the appropriate bits.

In practice, the procedure of FIG. 10 can be executed by separating the sequence $c_i$ into two subsequences: the systematic bits ($c_{i,3\times}$) which are not subjected to puncturing, and the other bits to which the procedure as described with reference to FIG. 6 is applied, with appropriately adapted parameters, the sequence $g_i$ then being constructed by reinserting the systematic bits.

FIG. 11 shows steps adapted for replacing step 66 of FIG. 10 in the application of method 1 to the case of puncturing with a turbo code. Steps 70–76 are entirely similar to those bearing the same references in FIG. 6, and are executed only if k=1 or 2 in the initial test 69. If k=0, we go directly to step 72 so as to avoid puncturing the systematic bit. Steps 74–76 use, instead of the counters $e^{cm}[n_i]$, counters $e_k^{cm}[n_i]$ for k=1, 2 and $n_i$=0, 1, . . . , $F_i$–1, which are initialized to $Nfr_{k,i}=(E_i/3+\Delta N_{k,i}^{TTI})/F_i$ in step 60. The processing of these counters calls upon puncturing parameters:

$$e_{k,plus}^{cm}[col] = a_k \cdot Nfr_{k,i}$$

$$e_{k,minus}^{cm}[col] = -a_k \cdot \Delta N_k^{cm}[n_i],$$

the positive or zero integer $-\Delta N_k^{cm}[n_i]$ representing the number of parity bits k to be punctured in the course of frame $n_i$ of the TTI ($\Delta N_1^{cm}[n_i]+\Delta N_2^{cm}[n_i]=\Delta N^{cm}[n_i]$) .

In the case of repetition with a turbo code, the bit rate matching algorithm is the same as that of FIG. 7. The compressed mode can be taken into account according to method 1 by replacing step 66 of FIG. 7 by steps 69–76 of FIG. 11.

For the application of method 2 to the case of turbo codes (repetition or puncturing), it is sufficient to replace step 66 of FIG. 7 or 10 by steps 80–83 of FIG. 9.

The appendix to the present description provides a C pseudocode corresponding to an exemplary bit rate matching algorithm applied by the module $24_i$ in accordance with the present invention (method 2).

APPENDIX $e_{ini}[\ ]$ Initial value of variable e in the rate matching pattern determination algorithm.
  $e_{ini}[1]$: initial value for convolutional codes and for turbo codes Parity-1 bits
  $e_{ini}[2]$: initial value for turbo codes Parity-2 bits
$e_{plus}[\ ]$ Increment of variable e in the rate matching pattern determination algorithm.
  $e_{plus}[1]$: Increment of variable e in the rate matching for convolutional codes and for turbo codes Parity-1 bits
  $e_{plus}[2]$: Increment of variable e in the rate matching for turbo codes Parity-2 bits
$e_{minus}[\ ]$ Decrement of variable e in the rate matching pattern determination algorithm.
  $e_{minus}[1]$: Decrement of variable e in the rate matching for convolutional codes and for turbo codes Parity-1 bits
  $e_{minus}[2]$: Decrement of variable e in the rate matching for turbo codes Parity-2 bits Initialisation:

$\Delta N^{cm}_{ij}$: Negative or null: number of bits to be removed to create the required gaps in the compressed frames of the transmission time interval in case of compressed mode, in each transmission time interval on TrCH i with transport format j.
$\Delta N^{cm}[\ ]$: Negative or null: number of bits to be removed in each frame of the TTI, to create if needed the required gaps in this fram,e in each transmission time interval on TRCH i with transport format j. The value will be nul for the un-compressed frames. The size of this array is F, the number of frames in the TTI.

For Convolutional Codes:

$$\Delta N_i = \Delta N^{TTI}_{il} + \Delta N_{cm};$$

$$X_i = N_{il}^{TTI};$$

$$e_{ini}[1]=1;$$

$$e_{plus}[1]=2\ N_{il}^{TTI};$$

$$e_{minus}[1]=2|\Delta N_i|$$

puncturing part of algorithm is applied if $\Delta N_i <= 0$, repetition is applied otherwise.

For Turbo Codes $$\Delta N_i[1] = \text{round down}(\Delta N^{TTI}_{il}/2) + \text{round up}(\Delta N^{cm}/2), \text{ if } Y \text{ sequence}$$

$$\Delta N_i[2] = \text{round up}(\Delta N^{TTI}_{il}/2) + \text{round down}(\Delta N^{cm}/2), \text{ if } Y \text{ sequence}$$

$$X_i = N_{il}^{TTI}/3;$$

$$e_{ini}[1]=X_i;$$

$$e_{ini}[2]=X_i;$$

$$e_{plus}[1]=2\ X_i;$$

$$e_{plus}[2]=X_i;$$

$$e_{minus}[1]=2|\Delta N_i[1]|;$$

$$e_{minus}[2]=|\Delta N_i[2]|$$

puncturing part of algorithm is applied if $\Delta N_i[1]<=0$ or $\Delta N_i[2]<=0$, repetition part is applied otherwise

```
Algorithm:
e[1] = e_ini    [1] -- initial error between current and desired puncturing ratio
α = 1           -- parameter for the range of index m
if Turbo Codes then
    e[2] = e_ini [2]
    if puncturing is needed then α = 2 else α = 3 endelse
endif
m = 1    -- index of current bit in the information bit flow (input flow)
n = 1    -- index of bit in the output flow before first interleaver
for i = 0 to F-1 do cbi[i] = 0   -- initiate counter of number of bits inserted in
                                    each frame of the TTI
            if puncturing is to be performed do while m <= α X_i
                if Turbo Codes then
                    c = m mod 2              -- c = 1 if Parity-1 bit, c = 2 if Parity-2 bit
                    if(c==1) then n = n+1 endif    -- in output flow increment output
```

-continued

```
                index to take into account bit X
        else
            c = 1
        endelse
        [c]= e[c] – e_minus [c]  -- update error
        if e[c] <= 0 then   -- check if bit number m should be punctured
            set bit x_{i,m} to δ where δ∉{0,1}
            e[c] = e[c] + e_plus[c]  -- update error
        else
            col = BR[(n–1) mod F]  -- calculate index of column where this bit will go
            while cbi[col] < |ΔN^{cm} [col]| do
                insert one bit marked << p >> in output position n -- insert marked bit to be
                                                                     removed in compressed frame
                                                                     when creating the gap
                n = n + 1                -- update output index since 1 bit is inserted
                cbi[col] = cbi[col] + 1  -- update counter of bits p inserted in this column
                col = BR[(n–1) mod F]    -- update column value of next position
            enddo
            n = n + 1   -- update output index, since bit x_m was not punctured
        endelse
        m = m + 1            -- next bit
    end do
else
    do while m <= α X_1
        e = e – e_minus    -- update error
        col = BR[(n–1) mod F)]
        while cbi[col] <ΔN^{cm}[col] do
            insert one bit marked p in position n
            n = n + 1     -- update output index
            cbi[col] = cbi[col] + 1   -- update counter of bits p inserted in this column
            col = BR[ (n–1) mod F]    -- update column value of next position
        enddo
        do while e <= 0          -- check if bit number m should be repeated
            col = BR[ (n–1) mod F]        -- calculate column where the current
                                             position will go
            while cbi[col] <ΔN^{cm}[col] do
                insert one bit marked p
                n = n + 1         -- update output index since 1 bit has been inserted
                cbi[col] = cbi[col] + 1   -- update counter of bits p inserted in this column
                col = BR[ (n–1) mod F]    -- update column value of next position
            enddo
            repeat bit x_{i,m}
            n = n + 1       -- update output index since bit has been repeated
            e = e + e_plus  -- update error
        end do
        m = m + 1    -- next bit
    end do
end if
```

What is claimed is:

1. Method of processing X streams of information symbols to be transmitted on Y communication channels, X and Y being positive integers, wherein the Y communication channels simultaneously occupy a transmission resource organized as successive frames, wherein the successive frames include compressed-mode frames each having at least one inactive period during which no symbol is transmitted, wherein the information symbols of each stream i ($1 \leq i \leq X$) are transmitted in successive transmission time intervals each comprising $F_i$ consecutive frames, $F_i$ being a positive integer, and wherein, for each transmission time interval relating to a stream i ($1 \leq i \leq X$), integers $E_i$, $\Delta N_i^{TTI}$ and $\Delta N_i^{CM}$ are defined such that $E_i > 0$, $\Delta N_i^{CM} < 0$ if said transmission time interval comprises at least one compressed-mode frame and $\Delta N_i^{CM} = 0$ if said transmission time interval does not comprise any compressed-mode frame, the method comprising the following steps for each transmission time interval relating to a stream i ($1 \leq i \leq X$):

forming a first sequence of $E_i$ coded symbols from information symbols of said stream pertaining to said transmission time interval;

forming a second sequence of symbols including $E_i + \Delta N_i^{TTI} + \Delta N_i^{CM}$ symbols extracted from the first sequence and $-\Delta N_i^{CM}$ marked symbols;

forming a third sequence of symbols by a permutation of the symbols of the second sequence;

distributing the symbols of the third sequence into $F_i$ segments of consecutive symbols, the $F_i$ segments being respectively assigned to the frames of said transmission time interval; and for each frame of said transmission time interval, forming a fourth sequence of symbols extracted from the segment assigned to said frame, said permutation and the placing of the marked symbols in the second sequence when said transmission time interval comprises at least one compressed-mode frame being such that each marked symbol belongs, in the third sequence, to a segment assigned to a compressed-mode frame, and the following steps for each frame:

forming a fifth sequence of symbols including the symbols of the fourth sequence output for, said frame in relation to each stream;

distributing the symbols of the fifth sequence into Y segments of symbols, the Y segments being respectively assigned to the Y communication channels;

for each communication channel, forming a sixth sequence of symbols extracted from the segment assigned to said communication channel;

for each communication channel, forming a seventh sequence of symbols by a permutation of the symbols of the sixth sequence; and transmitting on each conmmunication channel, in time slots of said frame, symbols extracted from the seventh sequence, each of said marked symbols being deleted before transmission on each communication channel when said frame is in compressed mode, so as to provide said inactive period within the frame.

2. Method according to claim 1, wherein said marked symbols are kept until the seventh sequences when said frame is in compressed mode, without being extracted from the seventh sequences for transmission.

3. Method according to claim 1, wherein additional marked symbols are inserted into the second or the fifth sequence, these symbols being kept until the seventh sequences so as to be transmitted with zero transmission power.

4. Device for processing X streams of information symbols to be transmitted on Y communication channels, X and Y being positive integers, the Y communication channels simultaneously occupying a transmission resource organized as successive frames, the successive frames including compressed-mode frames each having at least one inactive period during which no symbol is transmitted, the information symbols of each stream i ($1 \leq i \leq X$) being transmitted in successive transmission time intervals each comprising $F_i$ consecutive frames, $F_i$ being a positive intefer, integers $E_i$, $\Delta N_i^{TTI}$ and $\Delta N_i^{cm}$ being defined for each transmission time interval relating to a stream i ($1 \leq i \leq X$), with $E_i$,0, $\Delta N_i^{cm} < 0$ if said transmission time interval comprises at least one compressed-mode frame and $\Delta N_i^{cm}=0$ if said transmission time interval does not comprise any compressed-mode frame, the device comprising:

means for forming a first sequence of $E_i$ coded symbols from information symbols of each stream i ($1 \leq i \leq X$) pertaining to a transmission time interval;

means for forming, for each transmission time interval relating to a stream i ($1 \leq i \leq X$), a second sequence of symbols including $E_i + \Delta N_i^{TTI} + \Delta N_i^{CM}$ symbols extracted from the first sequence and $-\Delta N_i^{CM}$ marked symbols;

means for forming a third sequence of symbols by a first permutation of the symbols of each second sequence;

means for distributing the symbols of each third sequence, formed for a transmission time interval relating to a stream i ($1 \leq i \leq X$), into $F_i$ segments of consecutive symbols respectively assigned to the frames of said transmission time interval, and for forming $F_i$ fourth sequences of symbols respectively extracted from the segments assigned to said frames;

means for forming, for each frame, a fifth sequence of symbols including the symbols of the fourth sequence output for said frame in relation to each stream i ($1 \leq i \leq X$);

means for distributing the symbols of each fifth sequence into Y segments of symbols respectively assigned to the Y communication channels;

means for forming a sixth sequence of symbols extracted from the segment assigned to each communication channel; and means for forming a seventh sequence of symbols by a second permutation of the symbols of each sixth sequence, and for transmitting, in time slots of each frame on each communication channel, symbols extracted from the seventh sequence, wherein the first permutation and the placing of the marked symbols in the second sequence, formed for a transmission time interval relating to a stream when said transmission time interval comprises at least one compressed-mode frame, are such that each marked symbol belongs, in the third sequence formed for said transmission time interval, to a segment assigned to a compressed-mode frame, each of said marked symbols being deleted before transmission on each communication channel so as to provide said inactive period within the frame.

5. Device according to claim 4, wherein the means for forming the third, fourth, fifth, sixth and seventh sequences of symbols are arranged to keep said marked symbols until the seventh sequences formed for each compressed-mode frame, whereby said marked symbols are not extracted from the seventh sequences for transmission.

6. Device according to claim 4, comprising means for inserting, into the second or fifth sequences, additional marked symbols which are kept until the seventh sequences so as to be transmitted with zero transmission power.

7. Radiocommunication base station comprising source means for providing X streams of information symbols to be transmitted on Y communication channels simultaneously occupying a transmission resource organized as successive frames, X and Y being positive integers, processing means for forming sequences of output symbols from said X streams of information symbols, and transmission means for transmitting said sequences of output symbols on the Y communication channels, wherein the successive frames include compressed-mode frames each having at least one inactive period during which no symbol is transmitted, the information symbols of each stream i ($1 \leq i \leq X$) being transmitted in successive transmission time intervals each comprising $F_i$ consevutive frames, $F_i$ being a positive integer, wherein integers $E_i$, $\Delta N_i^{TTI}$ and $\Delta N_i^{cm}$ are defined for each transmission time interval relating to a stream i ($1 \leq i \leq X$), with $E_i$,0, $\Delta N_i^{cm}<0$ if said transmission time interval comprises at least one compressed-mode frame and $\Delta N_i^{cm}=0$ if said transmission time interval does not comprise any compressed-mode frame, wherein the processing means comprise:

means for forming a first sequence of $E_i$ coded symbols from information symbols of each stream i ($1 \leq i \leq X$) pertaining to a transmission time interval;

means for forming, for each transmission time interval relating to a stream i ($1 \leq i \leq X$), a second sequence of symbols including $E_i + \Delta N_i^{TTI} + \Delta N_i^{cm}$ symbols extracted from the first sequence and $-\Delta N_i^{cm}$ marked symbols;

means for forming a third sequence of symbols by a first permutation of the symbols of each second sequence;

means for distributing the symbols of each third sequence, formed for a transmission time interval relating to a stream i ($1 \leq i \leq X$), into $F_i$ segments of consecutive symbols respectively assigned to the frames of said transmission time interval, and for forming $F_i$ fourth sequences of symbols respectively extracted from the segments assigned to said frames;

means for forming, for each frame, a fifth sequence of symbols including the symbols of the fourth sequence output for said frame in relation to each stream i ($1 \leq i \leq X$);

means for distributing the symbols of each fifth sequence into Y segments of symbols respectively assigned to the Y communication channels;

means for forming a sixth sequence of symbols extracted from the segment assigned to each communication channel; and means for forming one of said sequences of output symbols by a second permutation of the symbols of each sixth sequence, wherein the first permutation and the placing of the marked symbols in the second sequence, formed for a transmission time interval relating to a stream when said transmission time interval comprises at least one compressed-mode frame, are such that each marked symbol belongs, in the third sequence formed for said transmission time interval, to a segment assigned to a compressed-mode frame, each of said marked symbols being deleted before transmission on each communication channel so as to provide said inactive period within the frame.

8. Base station according to claim 7, wherein the means for forming the third, fourth, fifth and sixth sequences of symbols and the sequence of output symbols are arranged to keep said marked symbols until the sequences of output symbols formed for each compressed-mode frame, whereby said marked symbols are not extracted from the sequences of output symbol for transmission.

9. Base station according to claim 7, wherein the processing means further comprise means for inserting, into the second or fifth sequences, additional marked symbols which are kept until the sequences of output symbols so as to be transmitted with zero transmission power.

* * * * *